Dec. 3, 1968    H. S. NORVILLE ET AL    3,413,708
PROCESS FOR MACHINING EXPANDED HONEYCOMB
Filed Sept. 12, 1966
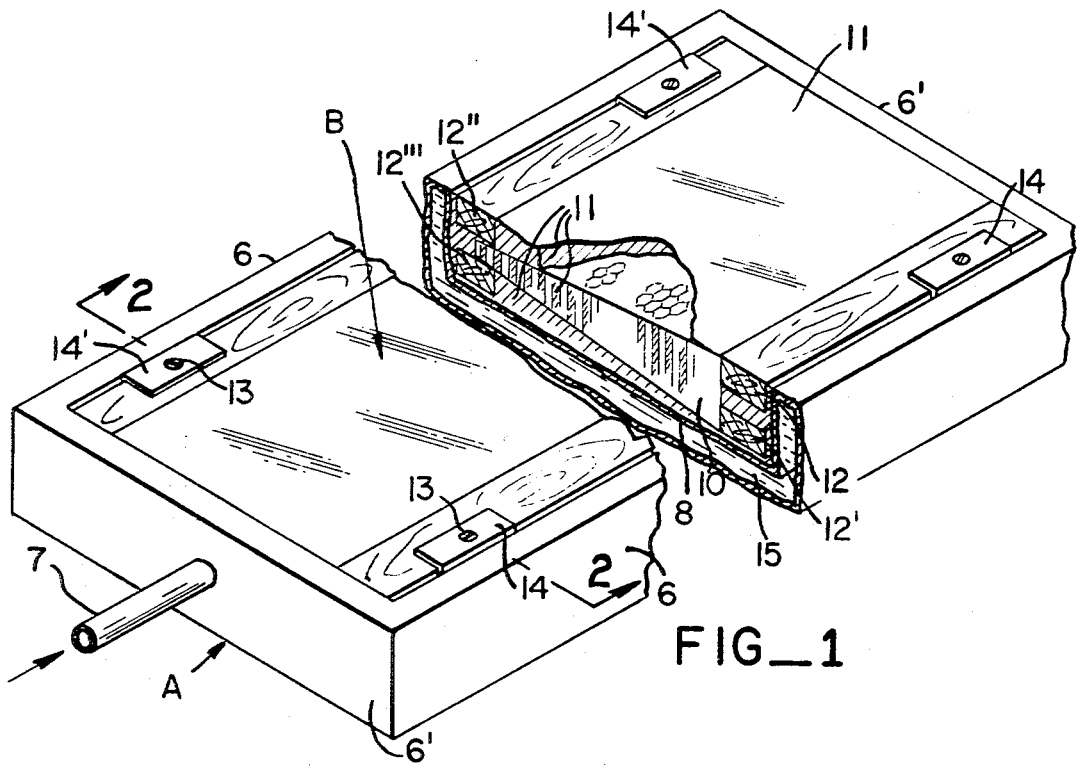
FIG_1
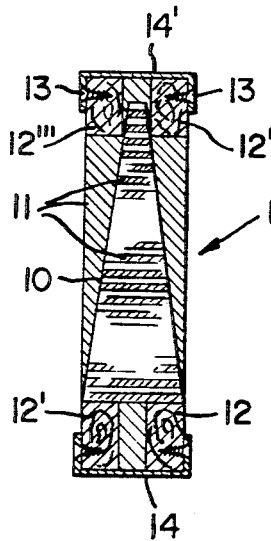
FIG_2
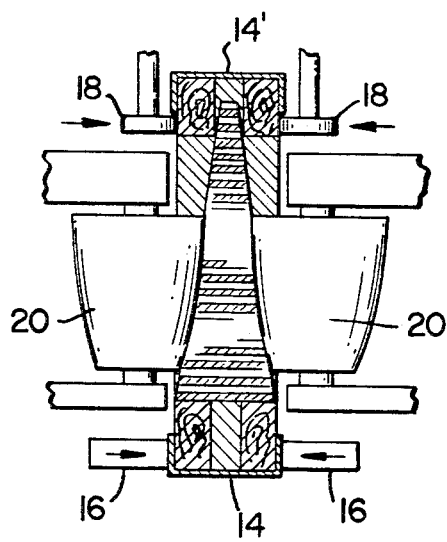
FIG_3
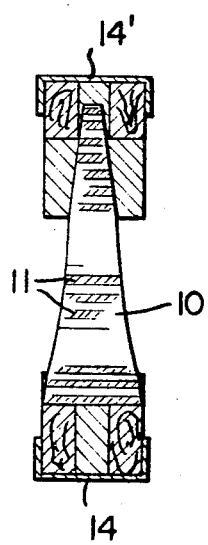
FIG_4
INVENTOR.
HOLMES S. NORVILLE
TIBOR ECKSTEIN
by  Townsend & Townsend
ATTORNEYS 3,413,708
PROCESS FOR MACHINING
EXPANDED HONEYCOMB
Holmes S. Norville, Corte Madera, and Tibor Eckstein, Oakland, Calif., assignors to Hexcel Products, Inc., Berkeley, Calif.
Filed Sept. 12, 1966, Ser. No. 578,692
6 Claims. (Cl. 29—423)

This invention relates to a method for stabilizing a thin-walled expanded honeycomb-type structure to enhance its handling during various machining operations and, more particularly, to the preparation of a reinforced expanded honeycomb-type structure especially suitable for rigid positioning during multiple-surface machining operations.

In the application of structural honeycomb to field such as aircraft design it is frequently necessary to machine the expanded honeycomb to close tolerance shapes or contours. Such milling, contouring or shaping operations require machining which is difficult or impossible to accomplish unless the thin-walled honeycomb structure is in some manner supported or rigidly stabilized.

In this regard, use has previously been made of certain synthetic water-soluble waxes which solidify at a low temperature and are suitable for removable by water washing; see U.S. Patent No. 3,176,387, issued Apr. 6, 1965. However, expanded honeycomb which has been machined in this manner must be thoroughly cleaned of residual quantities of the synthetic wax which, if allowed to remain on the machined surfaces, would prevent proper adhesive bonding, as well as inhibiting subsequent fabrication operations. Such thorough cleaning operations are, of course, expensive and when added to the cost of the synthetic waxes, which are usually destroyed, result in an overall cost which is prohibitive for most applications.

It has also been heretofore broadly proposed to stabilize honeycomb with ice. In one operation as disclosed in U.S. Patent No. 2,905,064, issued Sept. 22, 1959, the expanded honeycomb structure is first placed on a freezing plate and the cells sprayed with water. The lowered temperature of the plate causes the water to solidify within the cells and further forms an ice bond between the lower surface of the expanded honeycomb and the plate. While thus stabilized and jigged, the upper surface of the honeycomb is machined whereafter the temperature of the plate is raised sufficiently to melt the ice and release the honeycomb structure from the plate.

One disadvantage of the method as described in Patent No. 2,905,064 is that two opposed honeycomb surfaces cannot be machined simultaneously. Presumably if both sides of the honeycomb structure as disclosed in Patent No. 2,905,064 are to be machined, the entire freezing and jigging process would have to be repeated—i.e., the honeycomb part after being machined along its upper surface would have to be inverted and placed on the freezing plate with water again sprayed or poured into the cells and refrozen to the plate to permit machining of the second side. Not only is such duplication of process time consuming, inefficient and uneconomic, but can present very difficult problems of solution is terms of jigging the honeycomb the second time in reference to the machining equipment and in such manner as to obtain precise and accurate tolerances. Such difficulties would be increased to an extraordinary degree in instances where the honeycomb part must be contoured in the shape of simple or compound curves on both sides, as is necessary in contouring core structures for helicopter rotor blades and the like.

Although the concept of simply encasing a piece of honeycomb entirely within a block of ice and then clamping the frozen block in a clamping fixture so as to expose opposite surfaces of the honeycomb to simultaneous machine tool action has suggested itself, such concept in and of itself is practically inoperable for the reason that clamping pressure applied to opposite sides of an ice cake will cause the ice to melt at the pressure zones. Partial melting of the ice will in turn cause loss of clamping pressure and permit the block to shift or move during machining operation with consequent inability to maintain the honeycomb part encased within the ice block in absolutely fixed and stabilized position relative to the machine tool. Obviously, any shifting or moving of the honeycomb part during machining would result in inaccurate and unpredictable machining of the part to close tolerances.

A principal object of the present invention is to provide a way by which the honeycomb part to be machined can be entirely encased and stabilized within a solid frozen block of ice and wherein further there is bonded within the ice structure pressure pads by which the block with honeycomb encased therein can be tightly clamped against its opposite sides to permit the block to be fed into a milling machine so as to machine and contour opposite sides of the honeycomb to extremely close tolerances. The pressure pads as contemplated within the scope of the present invention are selected from a class of material which will form a strong bond with the ice and further which preferably have such a low coefficient of expansion that thermal contraction during the freezing operation will not unduly stress and weaken the bond forming between it and the ice to any appreciable extent. Although there are a variety of theoretically acceptable materials, we have found that wood, such as mahogany, makes for an extremely efficient and economic pressure pad material.

Another object and advantage of the present invention is to provide a method for encasing a honeycomb structure in conjunction with pressure pads within an integral block of ice in such manner that unpurified—i.e., ordinary tap water—can be used to provide dependable stability to the structure regardless of impurities in the water. In this connection, it is known and recognized that in areas of an ice block where substantial mineral or other impurities exist, the ice will be the "slushiest" and structurally the weakest. Accordingly, in practicing the present method the ice block is frozen in such manner that the purest ice is frozen and bonded to the surfaces of the honeycomb and pressure pads, whereas the ice with the greatest amount of impurities is caused to be concentrated at the upper extremities of the frozen block for subsequent machining off without any difficulty and without substantial risk of impure ice areas forming in the center of the block or immediately adjacent the honeycomb cells where it is required to have ice of uniform and dependable physical strength properties to maintain the honeycomb in firmly stabilized position during the machining operations. Whatever impure weakened ice areas form internally of the block itself will, in the case of metallic honeycomb, be concentrated adjacent the center axes of the cells which does not appreciably lessen the stabilizing effect of the ice bonded to the cell walls.

These objects, features and advantages of this invention will be better understood and others will become apparent when reference is made to the following detailed disclosure, especially in view of the attached drawings wherein:

FIG. 1 is a schematic view, partially cut away, illustrating a tray containing an ice block which includes an expanded honeycomb structure and supporting members;

FIG. 2 is a cross-sectional view taken along the line 2—2 of FIG. 1 of the ice block including the expanded honeycomb panel;

FIG. 3 is a cross-sectional view illustrating the machining of the ice block of expanded honeycomb shown in FIG. 2; and FIG. 4 is a cross-sectional view illustrating the ice block and expanded honeycomb as modified by the machining illustrated in FIG. 3.

It has now been found that simultaneous multiple-surface machining operations can be performed on an expanded block of honeycomb by providing pressure pads, i.e., supporting members having low heat-conductivity, embedded in the surface of the ice block to stabilize the block at those critical areas corresponding to the positions where the required machining clamping devices will contact the block. This is accomplished by preparing an ice block wherein the pressure pads are predisposed with respect to an expanded honeycomb structure (panel) at predetermined locations in a substantially horizontally aligned freezing tray. It will be appreciated by one skilled in this art that the expanded honeycomb structure may either be inserted into the tray before the pressure pads or that the pressure pads may first be positioned to provide support for the expanded honeycomb panel while the water is being introduced into the freezing tray.

After both the honeycomb and pressure pads are in the desired position, the tray is filled with sufficient water to provide the depth of ice block desired. Of course, the minimum depth of water preferred will be that which is sufficient to completely cover the thickest portion of expanded honeycomb. It is desirable that the maximum thickness of the resulting ice block be insufficient to cover the exposed surfaces of the upper pressure pads.

The cooling and attendant solidification of the water can be accomplished by any means well known to those of skill in this art. For example, this includes the use of a refrigeration unit of sufficient size so that the water-filled tray can be completely inserted therein. In such a conventional refrigeration unit, heat transfer from the exposed upper surface of the water, as well as from the liquid surfaces contacting the tray bottom and sides, and honeycomb structure itself will cause the water to freeze inwardly towards the center of each honeycomb cell. As a result, when impure tap water is employed to form the ice block in this manner, any dissolved impurities in the liquid will be trapped within the segment of ice in each of the honeycomb cells, thereby weakening the resulting ice block and making it unsuitable to provide the necessary support for the expanded honeycomb structure during subsequent machining operations.

However, it has been found that when the expanded honeycomb panel is formed of metal, even impure tap water can be employed, provided that the solidification of the water is accomplished in a hollow metallic freezing tray. It is preferred that the tray be constructed with double layered sides and a double layered bottom through which can be passed a coolant such as brine. By freezing water in this manner, substantially all the heat transfer will occur at the metal surfaces of both the tray and honeycomb. Therefore, the last portion of the water to freeze, i.e., that which will contain the impurities, will be that which is furthest from the high eat conductive metal surfaces. Consequently, this method of freezing will cause any dissolved impurities in the water to be concentrated toward the center axis of each cell and within the top layer of ice in the progressively frozen block. The substantially pure ice which first forms on and bonds to each exposed surface of metal honeycomb effectively increases the wall thickness of the material, and whatever small amount of impure ice that forms along the center axes of the cells will not, to any practical or appreciable extent, weaken the overall stability of the ice reinforced honeycomb. The impure upper layer of ice which forms on the block will be removed along with the first portion of ice during machining operations and therefore cause no problem.

Materials from which pressure pads of this invention can be fabricated include those substances which will form a strong bond with the ice, but which will have a coefficient of expansion approximately equal to that of the ice block. Other suitable materials include those which can accommodate the thermal expansion and contraction of the solidified liquid even though having a different coefficient of expansion. Particularly suitable materials include wood and plastics, especially wood because of its desirable property characteristics coupled with its availability and economy of use. Mahogany has been found very suitable, but when the pressure pads are to be machined along with the ice block and expanded honeycomb structure, common pine, for example, has been found to be suitable and readily expendable.

Referring now to the drawing where similar characters of reference represent corresponding parts in each of the several views, there is shown a tray A having two pairs of opposed sides 6 and 6' and a bottom 8, all preferably of double-walled construction for the introduction and circulation of a coolant such as brine 15. Inlet means 7 and outlet means (not shown) are employed to circulate brine 15 from a heat extraction source (not shown).

Block B, defined by the internal dimensions of tray A, is composed of expanded honeycomb panel 10, pressure pads 12, 12', 12", and 12''', disposed in pairs along the pair of opposite sides 6 of tray A. The void spaces between panel 10 and pressure pads 12, 12', 12" and 12''' in tray A are filled with water which is solidified to form ice 11. Pressure pads 12 and 12', and 12" and 12''' are preferably maintained at their respective positions along the top and bottom of tray A during the solidification necessary to produce ice 11 by being secured to angle clamps 14 and 14', respectively, in a conventional manner, such as by screws 13. After the ice 11 is formed, the resulting block B is lifted out of the tray and positioned for machining as hereinafter described. The bonds produced between the ice, honeycomb and pressure pads have been found to be sufficient to maintain block B as an integral unit even during lengthy machining operations.

Turning now to FIGS. 2–4, block B is shown in an upright position in which it is subjected to simultaneous multiple-surface machining operations. Block B is rigidly secured by lower clampng means 16 and further guided by fixedly positioned rolling or sliding means 18. Clamping means 16 are preferably aligned to transmit inwardly directed holding pressure to angle clamps 14 so that block B will be maintained in a fixed rigid upright position during the machining thereof with rotary cutters 20. Of course, lower clamping means 16 can also be disposed to be in direct contact with lower pressure pads 12 and 12' to also produce the desired rigid support.

Block B is further guided and held by means 18, mounted above cutters 20, and disposed to provide rolling or sliding inwardly directed holding pressure. Referring particularly to FIG. 4, there is shown ice block B containing honeycomb panel 10 which has been contoured to an intermediate shape which, after removal of the ice and pressure pads and edge and side trimming, provides a desired finished product.

The machined expanded honeycomb panel 10 can be simply and quickly released from the ice block B by merely allowing the block to be heated to room temperature. Of course, the melting process may be accelerated by increasing the temperature of the surrounding environment above room temperature. The expanded honeycomb panel 10 is recovered completely free of undesirable residue or deposit and ready for further finishing operations.

By way of a specific example, a wedge of expanded $\frac{3}{16}''$ nominal cell size, 0.001" gauge, 5052 aluminum alloy honeycomb, 12' long and 3' wide and having a leading edge 3" wide and a trailing edge $\frac{3}{8}''$ wide was placed in a double-walled freezing tray. Further disposed within the tray and abutting the leading edge of the honeycomb panel were a pair of untreated mahogany strips 1¼" x 2½" x 12' which were held in spaced ½" apart relation at the top and bottom of the tray by angle irons. A second pair of mahogany strips were similarly spaced ½" apart at the trailing edge of the honeycomb panel with the trailing edge inserted therebetween. The tray was filled with sufficient water to cover the leading edge of the honeycomb. Brine was passed through the hollow tray for a period of time sufficient to freeze the water. The tray was then moved to a refrigerated room where the temperature was maintained between about 18 to 25° F. This temperature range was found to be optimum for subsequent machining operations.

The expanded honeycomb-containing ice block was thereafter removed from the tray, turned 90° and inserted within the clamps of a machine tool contouring device. The block was machined simultaneously on opposite sides to prescribed contoured tolerances and thereafter the ice was melted and the supports removed.

Although one embodiment of the invention employing water as the solidified liquid has been particularly shown and described, it will be apparent that other adaptations and modifications can be made without departing from the true scope and spirit of the invention.

What is claimed is:

1. In a process useful for simultaneously machining at least two surfaces of an expanded honeycomb structure while embedded and stabilized within a block of solidified liquid, the improvement comprising immersing in said liquid said honeycomb structure and a plurality of pressure pads disposed in predetermined positions corresponding to the location of applied clamping forces by which the solidified block is to be secured for movement during said machining, then solidifying said liquid to cause the same to firmly bond to said honeycomb structure and to said pressure pads.

2. A process in accordance with claim 1 wherein said liquid is water, which is solidified by freezing.

3. A process in accordance with claim 1 wherein said pressure pads are wooden strips.

4. The method of machining an expanded honeycomb core structure comprising: immersing said structure in a solidifiable liquid; also immersing pressure pad within said liquid and adajacent said structure; solidifying said liquid to cause embedding of said structure and said pads within an integral block of the solidified liquid; applying clamping forces to said pressure pads while feeding the encased honeycomb structure into position for machining and thereafter melting said solidified liquid to cause it to flow from said honeycomb core structure.

5. An intermediate product of manufacture comprising: an ice block; an expanded honeycomb panel disposed entirely within said ice block; and a plurality of longitudinal wooden pressure pad strips partially embedded in said ice block on opposite sides thereof and placed at predetermined locations corresponding to the areas of clamping forces to be applied to the block during subsequent machining operations.

6. A process for stabilizing a panel of expanded metallic honeycomb especially suitable for multiple-surface machining operations, comprising: positioning said expanded metallic honeycomb in a double-walled freezing tray; placing pressure pads having low heat-conductivity within said tray at predetermined spaced locations corresponding to the positions where clamping devices will be attached during said multiple surface machining operations; filling said tray with sufficient unpurified tap water to at least cover said honeycomb panel; and passing sufficient coolant between said double-layered walls to cause said water to progressively solidify from heat transfer substantially between the metal surfaces of said tray and honeycomb panel and said tap water to form ice outwardly from said metal surfaces wherein said impurities in the water will be concentrated in the ice, namely along the center axes of the cells and at the upper surface of the stabilized panel.

References Cited

UNITED STATES PATENTS

| | | | |
|---|---|---|---|
| 2,731,713 | 1/1956 | Schaeffer | 29—423 |
| 2,855,664 | 10/1958 | Griffith et al. | 29—424 |
| 2,905,064 | 9/1959 | Nielsen | 90—11 X |
| 2,937,437 | 5/1960 | Cole et al. | 29—424 |
| 3,176,387 | 4/1965 | Argueso, et al. | 29—423 |

THOMAS H. EAGER, *Primary Examiner.*